United States Patent [19]

Daigle et al.

[11] Patent Number: 4,834,935
[45] Date of Patent: May 30, 1989

[54] FEEDWATER SPARGER ASSEMBLY

[75] Inventors: Roland P. Daigle, East Granby, Conn.; Federico Ouevedo del Rio; Javier O. Lopez, both of Santander, Spain

[73] Assignee: Combustion Engineering, Inc., Windsor, Conn.

[21] Appl. No.: 686,113

[22] Filed: Dec. 24, 1984

[51] Int. Cl.$^4$ .............................................. G21C 13/02
[52] U.S. Cl. ..................................... 376/292; 376/204
[58] Field of Search ............... 376/203, 204, 285, 286, 376/291, 292, 370, 377, 389, 399; 285/47, 54; 165/135

[56]  References Cited

U.S. PATENT DOCUMENTS

| | | | |
|---|---|---|---|
| 3,818,935 | 6/1974 | Karker et al. | 376/291 |
| 4,356,147 | 10/1982 | Borrman et al. | 376/291 |
| 4,655,483 | 4/1987 | Margotta | 285/348 |

FOREIGN PATENT DOCUMENTS

| | | | |
|---|---|---|---|
| 86995 | 11/1977 | Japan | 376/377 |
| 100895 | 6/1984 | Japan | 376/292 |
| 6507072 | 6/1964 | Netherlands | 376/292 |

OTHER PUBLICATIONS

Diwinski et al., "Boiling Water Reactor Feedwater Nozzle Cladding Removal", TIS-5362, CE Inc., 1977.

"Dodewaard Werd Gerepareerd Met de Stopwatch Ind Dh Hand", 1983.
"Grafoil", Union Carbide, *Nuclear News*, Jun. 1986, Reader Service, No. 176.

Primary Examiner—Deborah L. Kyle
Assistant Examiner—Richard L. Klein
Attorney, Agent, or Firm—John H. Mulholland

[57]  ABSTRACT

A feedwater sparger assembly, and more particularly a thermal sleeve device, to prevent relatively cold feedwater from contacting the vulnerable surfaces of a feedwater nozzle in a boiling water nuclear reactor. Inner and outer concentric tubular thermal sleeve members (42,56) span the distance between the sparger (12) and a substantially cylindrical transition surface (34) machined into the feedwater nozzle (14) or pipe (22). At the first ends (46,64) of the tubular members, adjacent the transition surface (34), a packing means (50), is deformed against the transition surface (34). The second ends (60,62) of the tubular members are operatively connected to the sparger (12). One of the tubular members (42,56) is rigidly connected to the sparger (12) and the other tubular member is mounted on the sparger such that it can be longitudinally moved relative to the rigidly connected member. This longitudinal movement compresses the packing and intensifies an interference fit (78) between an outer surface (66) of the outer member (56) and the transition surface (34) to provide a fluid-tight seal.

10 Claims, 5 Drawing Sheets

FEEDWATER SPARGER ASSEMBLY

BACKGROUND OF THE INVENTION

This invention relates to components for introducing feedwater into a large pressure vessel, and more particularly, to the feedwater nozzles and sparger for a boiling water nuclear reactor vessel.

In a pressurized water boiling reactor for conventional design, feedwater is introduced above the nuclear reactor core through a plurality of feedwater inlet nozzles spaced at a common elevation around the nuclear pressure vessel. The flow through the inlet nozzle is deposited in an annular sparger or header which then distributes the inlet flow uniformly around the inside circumference of the vessel where it can be forced downward outside the core shroud, turned in the lower vessel head and forced upward through the reactor core.

Some years ago, close inspection of the internal surface of the feedwater inlet nozzles revealed cracks that could propagate and threaten the integrity of the nozzle. The area of the nozzle most susceptible to cracking is the region of greatest curvature defining the transition from the feedwater pipe and nozzle entry to the vessel wall. To prevent further propagation of cracks, measures were taken to machine away a portion of the nozzle, ranging from about 0.4 inches of metal removed from the bore to about 0.5 inches removed from the face. Also, attempts have been made to modify the nozzle sleeve.

In the conventional design, a sleeve is disposed between the sparger and the nozzle to provide a flow path therebetween. It is believed, that due to thermal expansion and contraction of the sparger, the sleeve moves back and forth on its nozzle landing surface. Leakage of the inlet water along the outside of the sleeve, coming into contact with the warmer, highly curved region of the nozzle, has created cracks. Thus, efforts have been made to prevent this leakage and to reduce the temperature difference between the nozzle and any feedwater that may come into contact therewith.

One proposed flow shroud or sleeve is disclosed in a paper entitled "Boiling Water Reactor Feedwater Nozzle Cladding Removal", G. A. Diwinski et al., TIS-5362, Combustion Engineering, Inc. (1977). Another proposed solution is shown schematically in a Dutch newspaper article entitled "Dodewaard Werd Gerepareerd Met de Stopwatch Ind Dh Hand", published Jan. 16, 1983, where a new sparger is fixed to a newly machined inner wall in the nozzle, by means of a spring and tumbler mechanism. By means of the mechanism, the sparger can expand and shrink while a new sleeve member can move independently from the nozzle and the sparger.

To the inventor's knowledge, none of the prior art solutions has effectively sealed off the vulnerable region of the nozzle, to prevent a flow of significantly cooler water along the nozzle surface during component expansion and contraction, or during other transients.

SUMMARY OF THE INVENTION

The present invention provides a feedwater sparger modification which can be readily installed in existing feedwater sparger systems of boiling water reactor vessels, and which effectively prevents relatively cold feedwater from contacting the vulnerable surfaces of the feedwater nozzle. In its broadest aspect, the invention includes concentric tubular thermal sleeve members that span the distance between the sparger and a substantially cylindrical transition surface machined into the feedwater pipe near its weld connection to the nozzle. At the first ends of the tubular members, adjacent the transition surface, a packing means, preferably grafoil, is annularly disposed between the tube ends for bearing upon the inner surface of the pipe transition region. The outer, second ends of the tubular members are operatively connected to the sparger. One of the tubular members is preferably rigidly connected to the sparger, and the other tubular member is mounted on the sparger such that it can be longitudinally moved relative the rigidly connected member. This longitudinal movement compresses the packing to deform it into sealing engagement against the pipe inner surface. The relative longitudinal movement also increases the force associated with an interference fit between the first end of the outer sleeve member and the pipe surface to provide a secondary, fluid tight seal.

Even as the sparger and other assembly components expand or contract, the packing member maintains its sealing effectiveness as it slides back and forth on the pipe transition surface. Particularly with the preferred grafoil packing material, this sliding motion is no more difficult to accommodate than the relative motion of a shaft and bearing for which the grafoil packing is more commonly used.

The invention not only prevents feedwater flow along the nozzle wall, but it also provides a double thermal sleeve barrier to heat transfer between the feedwater and the nozzle wall. The inner tubular member contains the feedwater flow entering the sparger, while the outer tubular member, which is preferably slightly spaced from the inner member, further diminishes the temperature gradient between any stagnant water on the nozzle surfaces, and the cooler water flowing through the inner tubular member.

BRIEF DESCRIPTION OF THE DRAWINGS

Additional features, benefits, and advantages of the present invention will become evident from the description of the preferred embodiment set forth below, with reference to accompanying drawings in which.

DESCRIPTION OF THE PREFERRED EMBODIMENT

Figure 1:
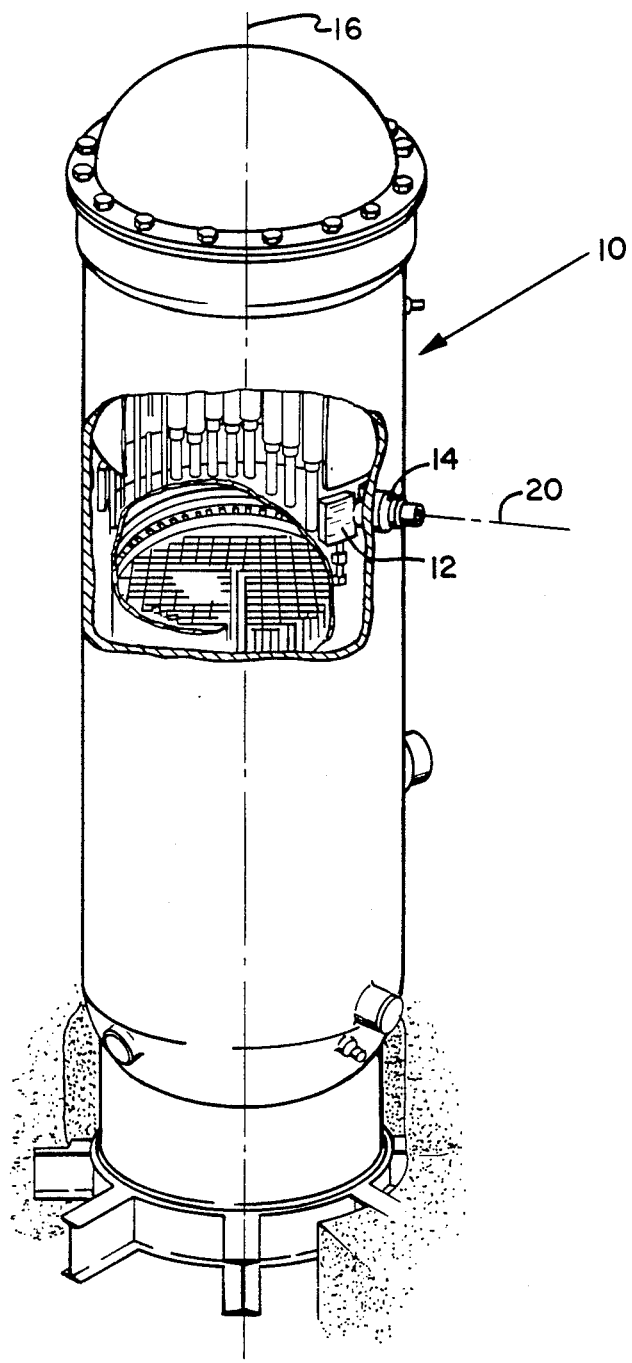
FIG. 1 is a partially cut-away view of a typical boiling water nuclear reactor, showing a feedwater inlet nozzle and the sparger.

FIG. 1 shows a partially sectioned elevation view of a typical boiling water nuclear reactor vessel 10, cut away to show a feedwater sparger or ring header 12 and a feedwater inlet nozzle 14 through which feedwater enters the vessel and is directed to the sparger. Typically, a plurality of feedwater inlet nozzles 14 are spaced around the reactor vessel 10 on a plane transverse to the vessel major axis 16.

Figure 2:
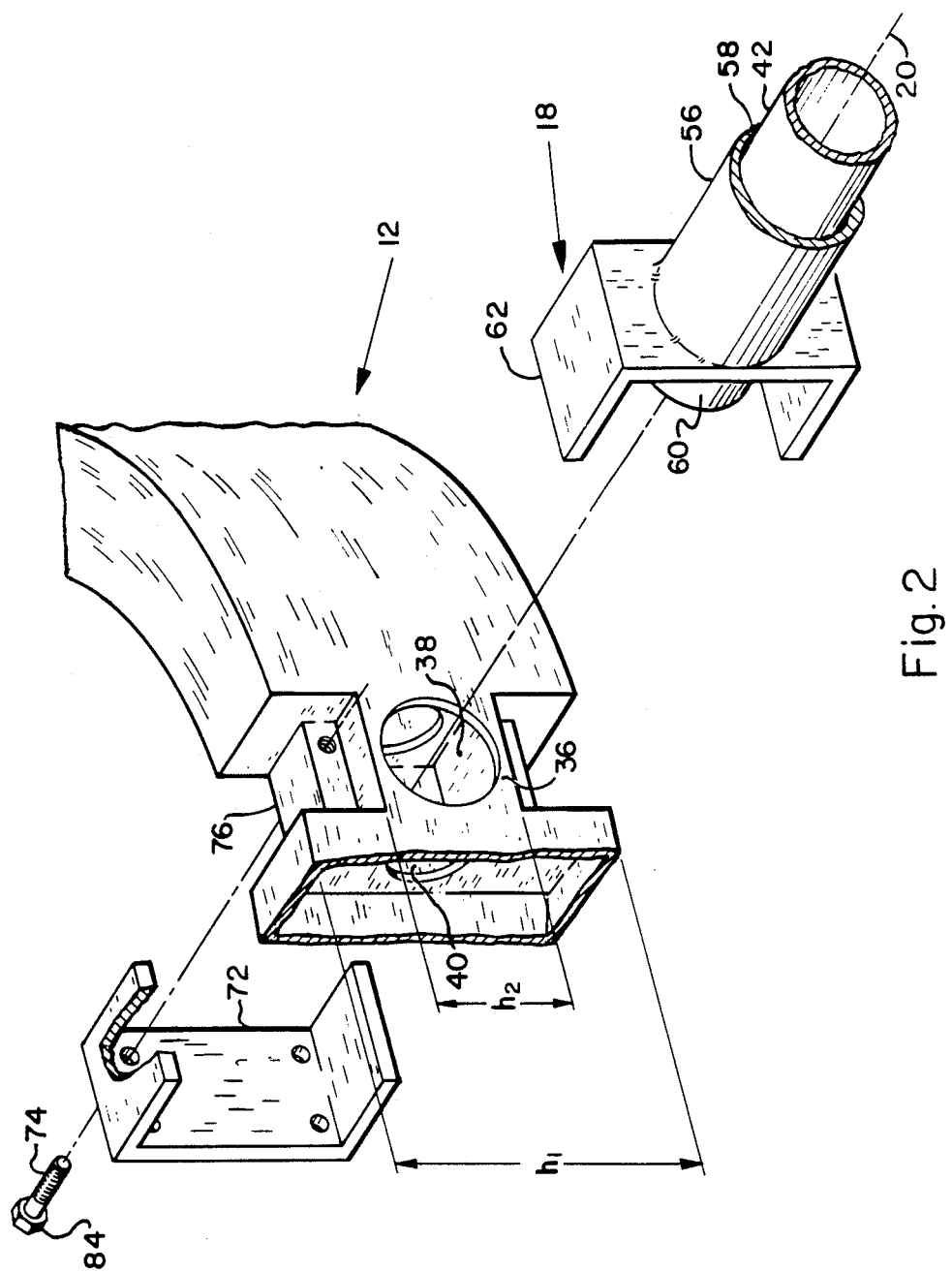
FIG. 2 is a schematic, isometric assembly view of the sparger and tubular thermal sleeve members, according to one embodiment of the invention, with the reactor vessel and nozzle removed for clarity.
Figure 3:
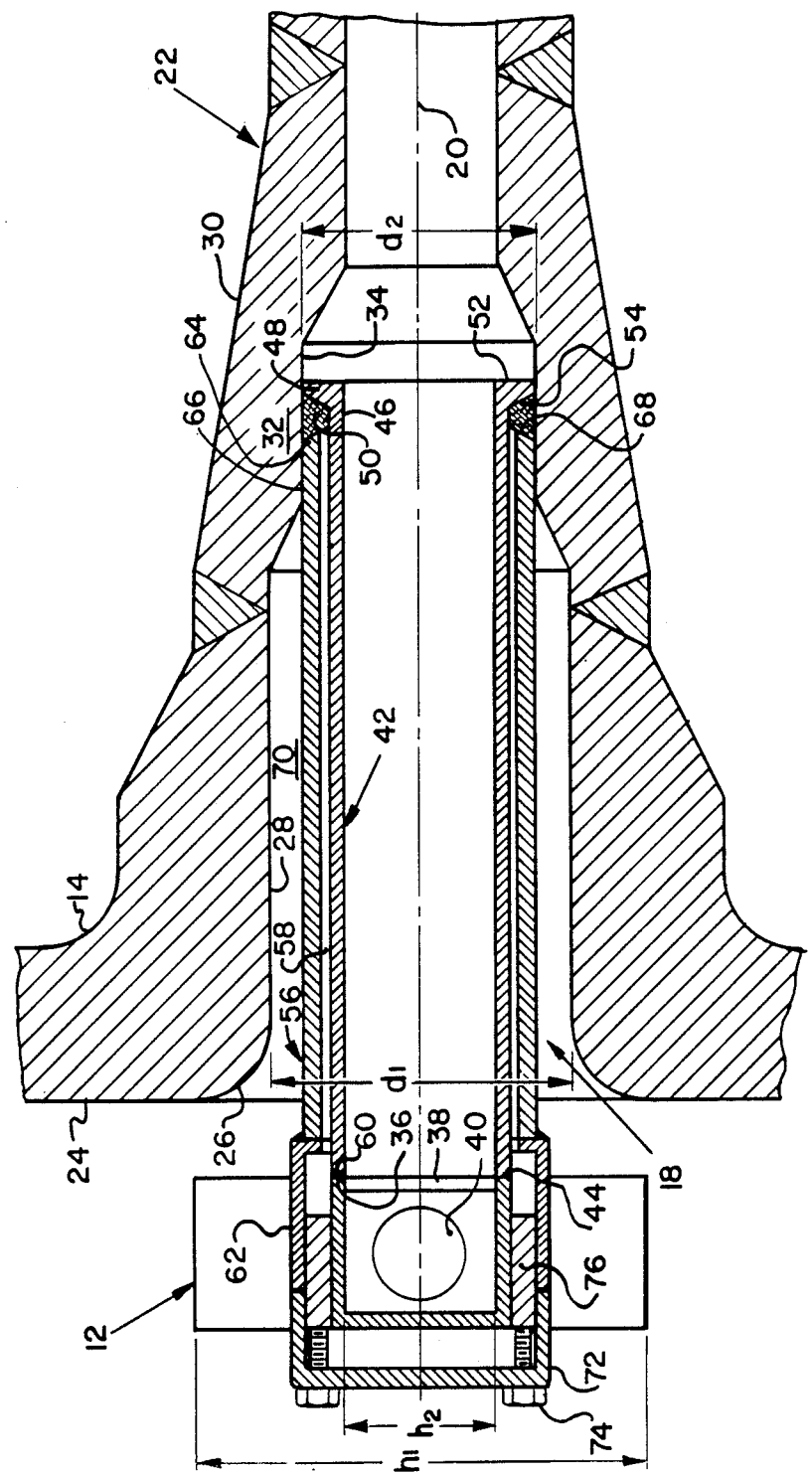
FIG. 3 is a sectioned elevation view of a portion of the reactor vessel including the feedwater inlet nozzle and associated sparger, with the invention shown in FIG. 2 fully installed.

FIGS. 2 and 3 show a thermal sleeve device 18 for mounting between the sparger 12 and nozzle 14, along the nozzle centerline 20. FIG. 2 is an isometric schematic view having the same orientation as shown in FIG. 1, illustrating the preferred way of mounting the device 18 on one type of sparger, if one could remove the nozzle to look therewithin. FIG. 3 shows the thermal sleeve device 18 in section, secured to both the sparger 12 and a transition piece or safe end 30 welded to the feedwater inlet pipe 22.

Referring now to FIG. 3, each nozzle typically includes a face 24, a curved portion 26, and an entry portion 28. The feedwater pipe 22 is typically welded to the entry portion 28 of the nozzle 14 and in the present invention, the pipe has a smaller diameter than that of the nozzle. A pipe transition segment or safe end region 30 at the welded end of the pipe has a stepped portion 32 including a smooth inner cylindrical surface 34.

Referring also to FIG. 2, the sparger 12 is spaced from the nozzle face 24 and, although generally having a height $h_1$ greater than the nozzle inner diameter $d_1$, it preferably narrows to a neck portion 36 of height $h_2$ less than the nozzle inner diameter, where the sparger intersects the nozzle centerline 20. The sparger neck has an opening 38 aligned with and facing the feedwater nozzle 14, and adjacent openings 40 such that feedwater flow may enter the sparger 12 and be distributed uniformly around the vessel outside the shroud (see FIG. 1). The sparger is rigidly supported within the reactor vessel in a conventional way (not shown), as is well known in the art.

In accordance with the present embodiment of the invention, the thermal sleeve device 18 includes four functional elements. First, an inner tubular thermal sleeve member 42 is aligned with the sparger opening 38 and spans the distance between the sparger 12 and the pipe transition region 30. The inner member 42 is rigidly connected or welded to the sparger neck 36 as at 44. The first, or upstream end 46 of the inner member includes shoulder means 48 for compressing an annular packing member 50, to be further described below. Preferably, the shoulder means 48 includes an outward flange 52 having a surface 54 adapted to mate with the contour of the packing member 50 to be inserted there against. The outer diameter of the flanged end of the internal tube must not exceed the internal diameter $d_2$ of the cylindrical pipe surface 34. In the embodiment illustrated in FIG. 3, the inner tubular member 42 is rigidly supported by the sparger neck 36 such that the inner member will directly follow the thermal expansion and contractions, or other movement, of the sparger 12.

The next component of the thermal sleeve device is the outer tubular member 56 which is coaxially disposed about the inner tubular member, and preferably slightly spaced therefrom to provide a stagnant annular insulating blanket 58 between the inner and outer members. The outer tubular member also spans the distance between the sparger 12 and the pipe transition region 30, and in the illustrated embodiment, extends beyond the second, or downstream end 60 of the inner tube such that the second end 62 of the outer member is above the necked portion 36 of the sparger. The second end 62 may have a modified shape as shown in FIG. 2, to mate with the landing area on the sparger or neck 36. The first end 64 of the outer member has a smooth surface 66 adapted to engage the cylindrical inner surface 34 of the pipe transition region to form a sealing, interference fit or joint. The first end 64 of the outer tubular member terminates in a contour 68 that matches that of the packing means or ring 50. This contoured extremity provides a compression surface to compress the packing means 50 against the shoulder means 48 of the inner tubular member 42, as more fully discussed below.

The third element of the thermal sleeve device is the packing means or ring 50 disposed circumferentially between the shoulder means 48 of the inner tubular member 42 and the extremity 68 of the outer tubular member 56. The purpose of this packing means is to maintain intimate contact against the pipe contoured surface 34 sufficient to prevent leakage of cold feedwater into the stagnant annular 70 between the sleeve device 18 and the nozzle 14. The preferred packing material is grafoil, which has been commonly used for packing valve stems and other relatively sliding components where leakage is to be minimized. The grafoil packing is compressed by "pinching" or "squeezing" between the contoured surfaces 68, 54 at the extremities of the second and first tubular member respectively. As will be more fully discussed below, the makeup or tightening of the thermal sleeve device 18 not only deforms the grafoil packing to effect the sliding seal, but it also intensifies the interference fit between the first end 64 of the outer tubular member and the cylindrical surface 34 in the pipe transition region 30.

The last element of the thermal sleeve device includes means mounted on the sparger 12 operatively connected to the outer tubular member 56 for effecting relative longitudinal motion between the inner and outer tubular members 42, 56. This assures that a circumferential portion 66 of the outer tubular member engages a portion 34 of the pipe cylindrical surface in rugged interference fit, and the packing means 50 is compressed to deform outwardly into sealing contact with another portion of the pipe surface 34. In the illustrated embodiment, the inner tubular member 42 is welded to the sparger at 44 and the second end 62 of the outer tube 56 is in contact with a "U" type bracket 72 that fits over the inner side of the sparger nozzle 36 but is spaced therefrom. Lag bolts 74 are secured to a boss 76 in the sparger neck 36 and upon torquing urge the outer tubular member 56 upstream, or towards the pipe 22, while tending to maintain the inner tubular member 42 stationary. This results in the deformation of the packing means 50 and actuation of the interference fit. An alternative embodiment will be described below, but it should be understood that, regardless of the embodiment, either the inner 42 of outer 56 tubular member will effectively be rigidly connected to the sparger 12, and the other member 42 or 56 will be longitudinally movable relative to the rigidly connected member.

Figure 4:
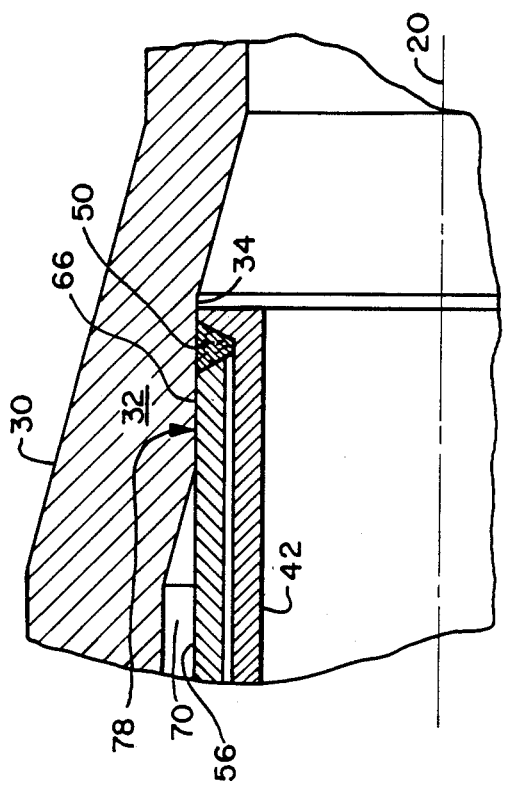
FIG. 4 is an enlarged view of the seal surfaces between the pipe inner surface and the thermal sleeve device in accordance with the embodiment illustrated in FIG. 3.

FIG. 4 shows an enlarged view of the interference fit 78 and actuated grafoil packing 50 as contemplated by the invention. The flow of feedwater comes from the right side of FIG. 4 and would be substantially fully prevented from entering the stagnant annulus 70 where relatively cool water is to be avoided. The primary seal is provided by the grafoil packing 50 against the smooth surfaces 66 of the outer tubular member and the pipe transition region respectively. The smooth surface 34 on the pipe 22 is substantially cylindrical, i.e., concentric to the pipe axis 20, or it can be very slightly tapered.

The outer diameter of the flanged end 52 of the inner tubular member 42 must be less than the outer diameter of the outer tubular member 56, to assure that the full extent of interference between the sleeve device and the pipe surface 34 is taken by the first end 64 of the outer member.

In the above-described embodiment of the invention the transition region 30 is shown in the pipe 22, as this is preferred. However, it should be understood that it is possible to find or modify nozzles 14 such that an appropriate step or similar transition 32 is provided therein for effecting the interference fit. It should be understood that there are other compatible ways for mounting the thermal sleeve device 18 on the sparger 12. From the present description of the functions to be accomplished by the mounting means, an ordinarily skilled practitioner in this art can devise appropriate mounting arrangements where, for example, the sparger is not necked down along the nozzle centerline.

Figure 5:
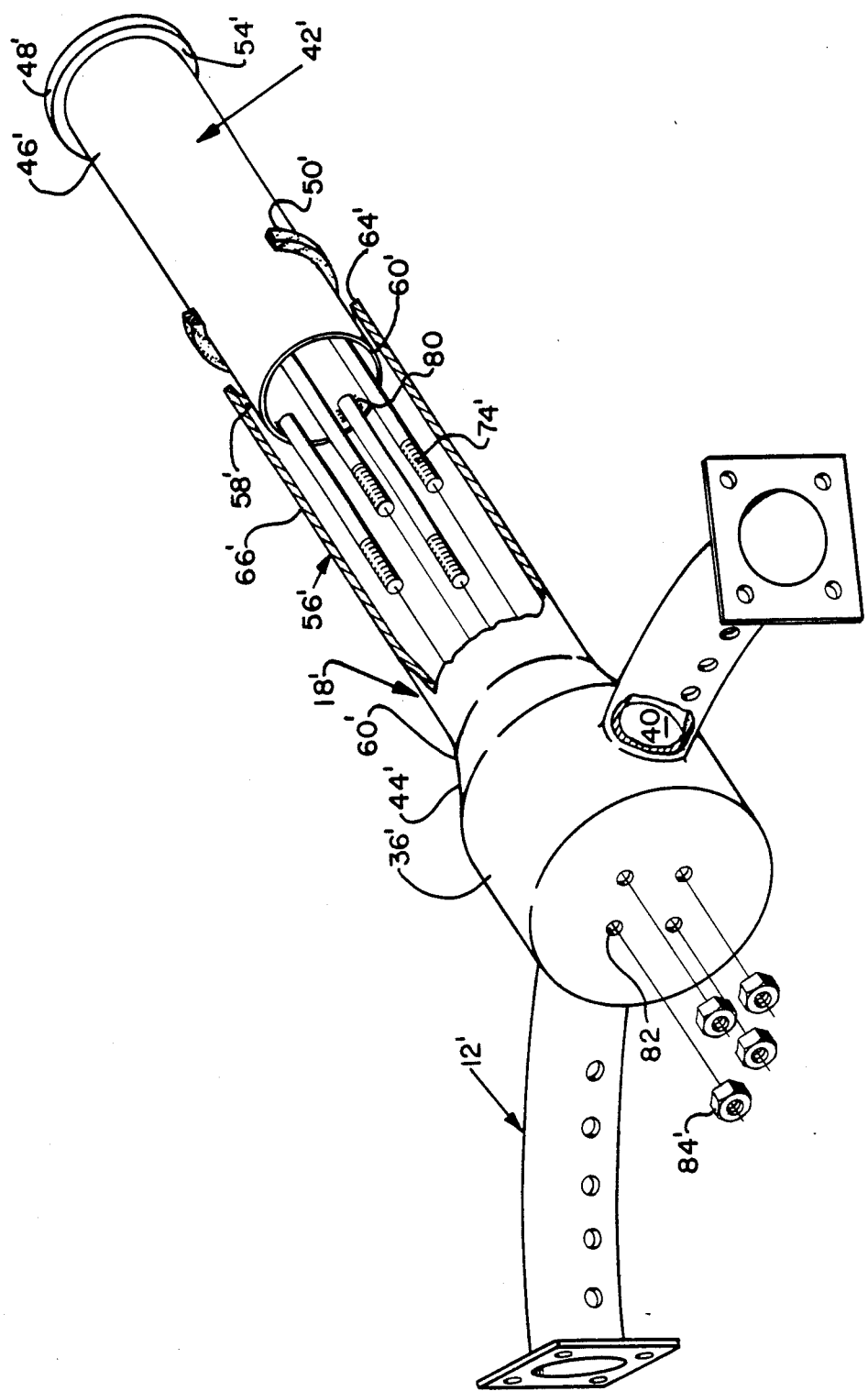
FIG. 5 is a schematic perspective view of another embodiment of the invention.

One such embodiment is shown in FIG. 5, where structure analogous to that described previously is identified with like but primed (') numerals. This embodiment might be found, for example, in a boiling water with nuclear reactor having a relatively small diameter sparger 12' with an enlarged neck 36' and integrally formed outer tubular member 56' extending into the nozzle to provide an entry flow path from the pipe 22. The outer tubular member 56' is thus, in this embodiment, considered to include a first end 64' disposed within the pipe 22 or safe end 30, and a second end 62' rigidly and fluidly connected to the neck 36' of the sparger 12', either integrally, or by means of circumferential weld 44'.

The inner tubular member 42' has a first end 46' including an enlarged outer portion 48' with a surface 54' adapted to mate with the packing or grafoil ring 50'. The inner tubular member is concentrically disposed within the outer tubular member. It need not be coextensive therewith, but should span the distance from the pipe 22 to the nozzle face 24, as shown in FIG. 3. A plurality of threaded bolts 74' are welded at the inside surface near the second end 60' of the inner tubular member, and are of sufficient length to extend through the neck portion 36' of the sparger 12'. The bolts 74' extend through openings 82 in the sparger neck 36' and by means of nuts 84', provide an operative connection for drawing the inner tubular member towards the reactor vessel relative to the stationary outer tubular member. The grafoil ring 50' is compressed between the flange 48' and the mating surface 66' at the first end 64' of the outer member 56'. As with the earlier described embodiment, the primary seal is effectuated by the compressed packing 50', but a secondary, interference fit seal is also achieved between the circumferential contact 66' near the first end 64' of the outer member against the smooth surface 34 as shown in FIG. 3.

It may be appreciated that this second-described embodiment allows a small portion of the feedwater entering the inner tubular member 42' to occupy the annular blanket space 58', but substantially all the feedwater flows enters the neck portion 36' is distributed around the reactor vessel via opening 40'.

The present invention offers many advantages relative to conventional solutions to the problem of avoiding relatively cooler feedwater flow from contacting the highly curved portion 26 of the nozzle 14. Primary and secondary seals assure that very little, if any feedwater can leak around the thermal sleeve device. The sealing surfaces can be easily released such that the sparger can be removed from the vessel to permit access for inspection of the nozzle.

We claim:

1. An improved feedwater sparger system for a boiling water nucler reactor, comprising in combination:
    a reactor vessel (10);
    a plurality of feedwater inlet nozzles (14) spaced around the reactor vessel (10) on a plane transverse to the vessel major axis;
    a feedwater pipe (22) welded to each of said feedwater nozzles, each pipe having a smaller inner diameter than that of the nozzle and including a generally stepped transition region (32) near said weld, said transition region including a substantially cylindrical inner circumferential pipe surface (34);
    a feedwater sparger (12) rigidly supported within the reactor vessel in substantially the same plane as said nozzles and spaced inwardly therefrom, said sparger having an inlet opening (38) aligned with and facing each of said feedwater nozzles;
    an inner tubular member (42) between the sparger and said pipe transition region;
    an outer tubular member (56) coaxially disposed around the inner tubular member and spanning the distance between the sparger and said pipe transition region;
    packing means (50) carried by said inner and outer tubular members for bearing upon the cylindrical inner surface of the transition region;
    means (44) rigidly connecting one of the first or second tubular members to said sparger;
    means (72,74,76) for effecting relative longitudinal movement between the first and second tubular members mounted on said sparger and effecting said movement by being connected to the other of said first or second tubular members,
    whereby a circumferential portion (66) of the outer tubular member is in an interference fit (78) relation with one portion of the pipe surface (34), and said package (50) is compressed and deformed outwardly into sealing contact with another portion of the pipe surface (34) due to relative movement created by the means for effecting relative longitudinal movement between the first and second tubular members.

2. The feedwater sparger system of claim 1 wherein a first end (46) of the inner tubular member (42) terminates with an external shoulder (48) adjacent said pipe surface (34) and said packing means (50) is compressed against said shoulder (48).

3. The feedwater sparger system of claim 2 wherein the first end (64) of the outer tubular member (56) is contoured (68) to match and press against the side walls of the packing means (50) to compress said packing means.

4. The improved feedwater sparger system of claim 2, wherein the outer tubular member (56') is a rigid, integral extension of the sparger (12',36') and the inner tubular member (42') has a plurality of bolts (74') rigidly extending from its second end (60'), said bolts adapted to mate with openings (82) on said sparger and with means (84) for drawing the bolts toward the sparger to compress said packing (50').

5. The feedwater sparger system of claim 1 wherein said means for effecting relative longitudinal motion include means for urging the outer tubular member towards said pipe while drawing the inner tubular member towards the vessel axis.

6. In a thermal sleeve device (18) of a boiling water nuclear reactor, said reactor having a reactor vessel (10), a feedwater inlet nozzle (14,30), at least a portion of an inner surface (34) of said nozzle which is cylindrical, and a feedwater sparger (12) located on the nozzle centerline (20) with the thermal sleeve device (18) between the sparger and the nozzle, the improvement comprising:
an inner tubular member (42) having
(a) a first end (46) including annular shoulder means (48);
(b) a second end (60) connected to the sparger (12);
(c) an annular packing (50) carried on the exterior of the first end (46) of the inner tubular member and abutting said shoulder means (48);
an outer tubular member (56) coaxially disposed around said inner tubular member (42) and including
(a) a first end (64) having a smooth outer circumferential surface (66) engaging the cylindrical inner surface (34) of said nozzle to form an interference fit (78), and a compression surface (68) compressing said packing (50) against said shoulder means (48);
(b) a second end (62) rigidly connected to the sparger (12); and means (72,74) for drawing the inner tubular member longitudinally relative to the outer tubular member, thereby effecting both an interference fit (78) between said outer tubular member (56) and said nozzle surface (34), and a fluid seal between the packing (50) and the nozzle surface (34).

7. The thermal sleeve device of claim 6 wherein the packing means is a grafoil ring.

8. In a thermal sleeve device (18) of a boiling water nuclear reactor, said reactor having a reactor vessel (10), a feedwater inlet nozzle (14,30), at least a portion of an inner surface (34) of said nozzle which is cylindrical, and a feedwater sparger (12) located on the nozzle centerline (20) with the thermal sleeve device (18) between the sparger and the nozzle, the improvement comprising:
an inner tubular member (42) having
(a) a first end (46) including annular shoulder means (48);
(b) a second end (60) connected to the sparger (12);
(c) an annular packing (50) carried on the exterior of the first end (46) of the inner tubular member and abutting said shoulder means (48);
an outer tubular member (56) coaxially disposed around said inner tubular member (42) and including
(a) a first end (64) having a smooth outer circumferential surface (66) engaging the cylindrical inner surface (34) of said nozzle to form an interference fit (78), and a compression surface (68) compressing said packing (50) against said shoulder means (48);
(b) a second end (62) rigidly connected to the sparger (12); and means (72,74) which includes a "U" bracket (71) secured to the sparger (12) for drawing the inner tubular member longitudinally relative to the outer tubular member, thereby effecting both an interference fit (78) between said outer tubular member (56) and said nozzle surface (34), and a fluid seal between the packing (50) and the nozzle surface (34).

9. In a thermal sleeve device (18) of a boiling water nuclear reactor, said reactor having a reactor vessel (10), a feedwater inlet nozzle (14,30), at least a portion of an inner surface (34) of said nozzle which is cylindrical, and a feedwater sparger (12) located on the nozzle centerline (20) with the thermal sleeve device (18) between the sparger and the nozzle, the improvement comprising:
an inner tubular member (42) having
(a) a first end (46) including annular shoulder means (48);
(b) a second end (60) connected to the sparger (12);
(c) an annular packing (50) carried on the exterior of the first end (46) of the inner tubular member and abutting said shoulder means (48);
an outer tubular member (56) coaxially disposed around said inner tubular member (42) and including
(a) a first end (64) having a smooth outer circumferential surface (66) engaging the cylindrical inner surface (34) of said nozzle to form an interference fit (78), and a compression surface (68) compressing said packing (50) against said shoulder means (48);
(b) a second end (62) rigidly connected to the sparger (12); and means (72,74) which includes bolts secured to said inner tubular member and means for drawing said bolts towards said reactor vessel for drawing the inner tubular member longitudinally relative to the outer tubular member, thereby effecting both an interference fit (78) between said outer tubular member (56) and said nozzle surface (34), and a fluid seal between the packing (50) and the nozzle surface (34).

10. In a thermal sleeve device (18) of a boiling water nuclear reactor, said reactor having a reactor vessel (10), a feedwater inlet nozzle (14,30), at least a portion of an inner surface (34) of said nozzle which is cylindrical, and a feedwater sparger (12) located on the nozzle centerline (20) with the thermal sleeve device (18) between the sparger and the nozzle, the improvement comprising:
an inner tubular member (42) having
(a) a first end (46) including annular shoulder means (48);
(b) a second end (60) connected to the sparger (12);
(c) an annular packing (50) carried on the exterior of the first end (46) of the inner tubular member and abutting said shoulder means (48);
an outer tubular member (56) which defines a rigid, integral extension of the sparger (12',36') coaxially disposed around said inner tubular member (42) which has a plurality of bolts (74') rigidly extending from its second end (60'), said bolts adapted to mate with openings (82) on said sparger and with means (84) for drawing the bolts toward the sparger to compress said packing (50'), and
said outer tubular member (56) including
(a) a first end (64) having a smooth outer circumferential surface (66) engaging the cylindrical inner surface (34) of said nozzle to form an interference fit (78), and a compression surface (68) compressing said packing (50) against said shoulder means (48);
(b) a second end (62) rigidly connected to the sparger (12); and means (72,74) for drawing the inner tubular member longitudinally relative to the outer tubular member, thereby effecting both an interference fit (78) between said outer tubular member (56) and said nozzle surface (34), and a fluid seal between the packing (50) and the nozzle surface (34).

* * * * *